United States Patent [19]
Cura et al.

[11] Patent Number: 5,642,390
[45] Date of Patent: Jun. 24, 1997

[54] URANIUM-CONTAINING NUCLEAR-FUEL SINTERED PELLET

[75] Inventors: Harald Cura, Dormitz; Martin Peehs, Bubenreuth; Gerhard Gradel; Alfons Roppelt, both of Forchheim; Erhard Ortlieb, Kalchreuth, all of Germany; Richard A. Perkins, Kennewick, Wash.

[73] Assignee: Siemens Aktiengesellschaft, Munich, Germany

[21] Appl. No.: 599,386

[22] Filed: Feb. 9, 1996

[30] Foreign Application Priority Data

Aug. 9, 1993 [EP] European Pat. Off. .............. 93112714
Aug. 20, 1993 [EP] European Pat. Off. .............. 93113358

[51] Int. Cl.⁶ .................................................. G21C 3/62
[52] U.S. Cl. .................................... 376/419; 252/640
[58] Field of Search .......................... 376/419; 252/638, 252/636, 640; 427/6; 148/401, 279

[56] References Cited

U.S. PATENT DOCUMENTS

| | | | |
|---|---|---|---|
| 3,427,222 | 2/1969 | Biancheria et al. | 376/419 |
| 4,560,575 | 12/1985 | Eisenstatt et al. | 376/419 |
| 4,683,114 | 7/1987 | Ho et al. | 376/419 |
| 4,774,051 | 9/1988 | Peehs et al. | 376/419 |

FOREIGN PATENT DOCUMENTS

| | | |
|---|---|---|
| 0147182 | 7/1985 | European Pat. Off. . |
| 0187472 | 7/1986 | European Pat. Off. . |
| 0239843 | 10/1987 | European Pat. Off. . |

OTHER PUBLICATIONS

Database INIS (IAEA) STN INIS Caesar Accession Number: 1232, AN—24 (11) : 39990 INIS, Nov. 1990.

Database INIS (IAEA) STN INIS Caesar Accession Number: 1236, AN—22 (6) : 23224 INIS, Sep. 1989.

*Primary Examiner*—Daniel D. Wasil
*Attorney, Agent, or Firm*—Herbert L. Lerner; Laurence A. Greenberg

[57] ABSTRACT

A uranium-containing nuclear-fuel sintered pellet containing $UO_2$, $(U, Pu)O_2$, $(U, Th)O_2$, $(U, RE)O_2$, $(U, Pu, Th)O_2$, $(U, Pu, RE)O_2$, $(U, Th, RE)O_2$ or $(U, Pu, Th, RE)O_2$, wherein RE=rare earth, has a sintered-pellet surface layer being formed of at least 80% by volume of a chemical boron compound $UB_x$ or $(U, \ldots)B_x$, wherein $x=2;4;6$ or 12, and a remainder of the sintered pellet containing at most 5% by volume of the chemical boron compound. A nuclear-reactor fuel assembly has a fuel rod containing such a uranium-containing nuclear-fuel sintered pellet in a cladding tube with the boron as a burnable absorber for thermal neutrons. The surface layer having the chemical boron compound is obtained by treating the nuclear-fuel sintered pellet with boron or a boron-containing chemical compound at an appropriately high treatment temperature.

81 Claims, No Drawings

URANIUM-CONTAINING NUCLEAR-FUEL SINTERED PELLET

CROSS-REFERENCE TO RELATED APPLICATION

This application is a Continuation of International Application Ser. No. PCT/EP94/02470, filed Jul. 26, 1994, published as WO95/04994, Feb. 16, 1995.

BACKGROUND OF THE INVENTION

FIELD OF THE INVENTION

The invention relates to a nuclear-fuel sintered pellet containing $UO_2$, $(U, Pu)O_2$, $(U, Th)O_2$, $(U, RE)O_2$, $(U, Pu, Th)O_2$, $(U, Pu, RE)O_2$, $(U, Th, RE)O_2$ or $(U, Pu, Th, RE)O_2$, wherein RE=rare earth. The invention also relates to a nuclear-reactor fuel assembly including a fuel rod having a cladding tube and such a uranium-containing nuclear-fuel sintered pellet in the cladding tube. The invention additionally relates to a method for treating such a uranium-containing nuclear-fuel sintered pellet.

Published European Patent Application 0 239 843 A1, corresponding to U.S. Pat. No. 4,774,051, discloses a nuclear-fuel sintered pellet made of $UO_2$, $(U, Pu)O_2$ or $(U, Th)O_2$. Boron is incorporated as a neutron poison in the chemical compound form $UB_x$, wherein x=2; 4 and/or 12 and/or $B_4C$, in a sinter matrix of that nuclear-fuel sintered pellet. That known nuclear-fuel sintered pellet is obtained by producing a mixture of uranium oxide powder or uranium mixed oxide powder with uranium boride powder or boron carbide powder and pressing it to form pellets which are subsequently sintered in a sintering furnace under a reducing sintering atmosphere to form nuclear-fuel sintered pellets. In those nuclear-fuel sintered pellets, the boron is thereby uniformly distributed throughout the sinter matrix.

From the neutron physics point of view, boron in uranium-containing nuclear-fuel sintered pellets is a burnable neutron absorber which loses its property as an absorber for thermal neutrons after those nuclear-fuel sintered pellets have been used in a nuclear reactor for a certain period of time.

Nuclear-reactor fuel assemblies having fuel rods that contain uranium-containing nuclear-fuel sintered pellets are used in a nuclear reactor, for example, during four sequential fuel assembly cycles, generally being of equal durations. At the end of a fuel assembly cycle, some of the nuclear-reactor fuel assemblies in the nuclear reactor are in each case replaced by fresh, unirradiated nuclear-reactor fuel assemblies.

The fresh, unirradiated nuclear-reactor fuel assemblies would cause a comparatively high reactivity in the nuclear reactor relative to the nuclear-reactor fuel assemblies that are already irradiated. However, the boron in the nuclear-fuel sintered pellets of those fresh, unirradiated nuclear-reactor fuel assemblies at first moderates the reactivity due to those nuclear-reactor fuel assemblies by initially absorbing thermal neutrons.

The nuclear fuel in fresh and unirradiated nuclear-reactor fuel assemblies gradually burns out in the nuclear reactor through nuclear decay, but a burnable neutron absorber that is present in that nuclear fuel simultaneously burns out gradually due to the physical effects of neutrons, so that finally, that neutron absorber absorbs no thermal neutrons or only very few. In that way, even unirradiated nuclear-reactor fuel assemblies being newly loaded into the nuclear reactor may cause approximately the same reactivity in the nuclear reactor during their entire residence time in the nuclear reactor, as the nuclear-reactor fuel assemblies which have already spent a fuel assembly cycle in the nuclear reactor.

Boron is advantageously used as a neutron absorber in a nuclear fuel as compared to other burnable neutron absorbers such as rare earths if the fuel assembly cycles are comparatively long, i.e., for example, longer than 12 months, since accumulation of heat in the nuclear fuel is avoided with boron.

SUMMARY OF THE INVENTION

It is accordingly an object of the invention to provide a uranium-containing nuclear-fuel sintered pellet, a nuclear-reactor fuel assembly having a uranium-containing nuclear-fuel sintered pellet and a method for treating a uranium-containing nuclear-fuel sintered pellet, which overcome the hereinafore-mentioned disadvantages of the heretofore-known products and methods of this general type and in which an excessively fast and excessively high increase in reactivity is not caused upon startup of a nuclear reactor if the nuclear-fuel sintered pellet is newly loaded, in the unirradiated state, in the nuclear reactor.

Since the surface of the uranium-containing nuclear-fuel sintered pellets in the cladding tube of a fuel rod in the nuclear reactor is kept relatively constant at a substantially lower temperature than the rest of the sintered pellet by a coolant flowing past the exterior of the cladding tube, whereas, however, in the case of the uranium-containing nuclear-fuel sintered pellet according to the invention most of the boron is situated in a surface layer, chemical reactions between $UB_x$ and $UO_2$ take place only to a limited extent in that surface layer, so that the boron cannot emerge from the uranium-containing nuclear-fuel sintered pellet according to the invention, and a reactivity increase having a rate and amplitude that is moderated is thereby guaranteed.

With the foregoing and other objects in view there is provided, in accordance with the invention, a uranium-containing nuclear-fuel sintered pellet containing $UO_2$, comprising a sintered-pellet surface layer being formed of at least 80% by volume of a chemical boron compound $UB_x$ with at least one number x from a number set 2; 4 and 12, and a remainder of the sintered pellet containing at most 5% by volume of the chemical boron compound.

With the objects of the invention in view, there is also provided a uranium-containing nuclear-fuel sintered pellet containing $(U, Pu)O_2$, comprising a sintered-pellet surface layer being formed of at least 80% by volume of a chemical boron compound $(U, Pu)B_x$ with at least one number x from a number set 2; 4 and 12, and a remainder of the sintered pellet containing at most 5% by volume of the chemical boron compound.

With the objects of the invention in view, there is additionally provided a uranium-containing nuclear-fuel sintered pellet containing $(U, Th)O_2$, comprising a sintered-pellet surface layer being formed of at least 80% by volume of a chemical boron compound $(U, Th)B_x$ with at least one number x from a number set 4 and 6, and a remainder of the sintered pellet containing at most 5% by volume of the chemical boron compound.

With the objects of the invention in view, there is further provided a uranium-containing nuclear-fuel sintered pellet containing $(U, RE)O_2$ (RE=rare earth), comprising a sintered-pellet surface layer being formed of at least 80% by volume of a chemical boron compound $(U, RE)B_x$ with at least one number x from a number set 4; 6 and 12, and a remainder of the sintered pellet containing at most 5% by volume of the chemical boron compound.

With the objects of the invention in view, there is also provided a uranium-containing nuclear-fuel sintered pellet containing (U, Pu, Th)$O_2$, comprising a sintered-pellet surface layer being formed of at least 80% by volume of a chemical boron compound (U, Pu, Th)$B_x$ with at least one number x from a number set 2; 4; 6 and 12, and a remainder of the sintered pellet containing at most 5% by volume of the chemical boron compound.

With the objects of the invention in view, there is additionally provided a uranium-containing nuclear-fuel sintered pellet containing (U, Pu, RE)$O_2$ (RE=rare earth), comprising a sintered-pellet surface layer being formed of at least 80% by volume of a chemical boron compound (U, Pu, RE)$B_x$ with at least one number x from a number set 2; 4; 6 and 12, and a remainder of the sintered pellet containing at most 5% by volume of the chemical boron compounds.

With the objects of the invention in view, there is further provided a uranium-containing nuclear-fuel sintered pellet containing (U, Th, RE)$O_2$ (RE=rare earth), comprising a sintered-pellet surface layer being formed of at least 80% by volume of a chemical boron compound (U, Th, RE)$B_x$ with at least one number x from a number set 4 and 6, and a remainder of the sintered pellet containing at most 5% by volume of the chemical boron compound.

With the objects of the invention in view, there is also provided a uranium-containing nuclear-fuel sintered pellet containing (U, Pu, Th, RE)$O_2$ (RE=rare earth), comprising a sintered-pellet surface layer being formed of at least 80% by volume of a chemical boron compound (U, Pu, Th, RE)$B_x$ with at least one number x from a number set 4 and 6, and a remainder of the sintered pellet containing at most 5% by volume of the chemical boron compound.

In accordance with another feature of the invention, there is provided at least 90% by volume of the chemical boron compounds in the sintered-pellet surface, and at most 2% by volume of the chemical boron compounds in the remainder of the sintered pellet.

In accordance with a further feature of the invention, there is provided at least 98% by volume of the chemical boron compound in the sintered-pellet surface layer, and at most 1% by volume of the chemical boron compound in the remainder of the sintered pellet.

In accordance with an added feature of the invention, the remainder of the sintered pellet is without a detectable boron content.

In accordance with an additional feature of the invention, the boron-containing sintered-pellet surface layer has a thickness of from 2 to 40 µm.

In accordance with yet another feature of the invention, the boron-containing sintered-pellet surface layer has a thickness of from 5 to 20 µm.

In accordance with yet a further feature of the invention, the isotope $B_{10}$ in the boron of the chemical boron compound is enriched relative to a natural isotopic composition.

With the objects of the invention in view, there is also provided a nuclear-reactor fuel assembly, comprising a fuel rod having a cladding tube, and such a uranium-containing nuclear-fuel sintered pellet in the cladding tube.

With the objects of the invention in view, there is additionally provided a method for treating a uranium-containing nuclear-fuel sintered pellet with boron or a boron-containing chemical compound, which comprises treating a uranium-containing nuclear-fuel sintered pellet with boron or a boron-containing chemical compound at a treatment temperature being high enough to form uranium-containing boride in a surface layer of the nuclear-fuel sintered pellet.

In accordance with another mode of the invention, there is provided a method which comprises carrying out the treatment step in the presence of hydrogen-containing inert gas.

In accordance with a further mode of the invention, there is provided a method which comprises carrying out the treatment step in the presence of at least one hydrogen-containing inert gas selected from the group consisting of helium, argon and nitrogen.

In accordance with an added mode of the invention, there is provided a method which comprises embedding the uranium-containing nuclear-fuel sintered pellet in a boron and/or a boron-containing chemical compound.

In accordance with an additional mode of the invention, the boron or boron-containing chemical compound contains an admixed catalyst.

In accordance with yet another mode of the invention, the boron or boron-containing chemical compound is in the form of a powder.

In accordance with yet a further mode of the invention, there is provided a method which comprises circulating the powder.

In accordance with yet an added mode of the invention, the boron or boron-containing chemical compound is in molten form.

In accordance with yet an additional mode of the invention, there is provided a method which comprises selecting the boron-containing chemical compound as at least one gas from the group consisting of borane, boron halide and boron alkyl.

In accordance with again another mode of the invention, there is provided a method which comprises selecting the powder as at least one material from the group consisting of boron carbide, silicon boride and metal boride, preferably zirconium diboride.

In accordance with again a further mode of the invention, there is provided a method which comprises setting the treatment temperature from 850° to 1600° C. and preferably from 1100° to 1450° C.

In accordance with a concomitant mode of the invention, there is provided a method which comprises setting a treatment time of from 10 minutes to 6 hours and preferably of from 1 to 4 hours.

Other features which are considered as characteristic for the invention are set forth in the appended claims.

Although the invention is illustrated and described herein as embodied in a uranium-containing nuclear-fuel sintered pellet, a nuclear-reactor fuel assembly having a uranium-containing nuclear-fuel sintered pellet and a method for treating a uranium-containing nuclear-fuel sintered pellet, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific examples.

DESCRIPTION OF THE PREFERRED EMBODIMENTS

Referring now to the steps of the method in detail, the following examples are described below:

A plurality of ceramic nuclear-fuel sintered pellets made of $UO_2$, which have the form of a solid cylinder with a diameter of 9.11 mm and a height of 10 mm were disposed next to one another to form a cylindrical column in an $Al_2O_3$ boat on a $ZrB_2$ powder bed that may, for example, contain at least one of the materials $NH_4Cl$, $BaF_2$ and/or $KBF_4$ admixed as a catalyst. Each of the nuclear-fuel sintered pellets had a sinter density of between 10.38 and 10.44 g/cm$^3$. The nuclear-fuel sintered pellets were also completely covered with $ZrB_2$ powder which may likewise, for example, contain $NH_4Cl$, $BaF_2$ and/or $KBF_4$ admixed as a catalyst.

The boat with the nuclear-fuel sintered pellets was then disposed in an $Al_2O_3$ tube and heated inside this tube in an electrically heated tube furnace for three hours at 1400° C. under a treatment atmosphere being formed of 5% $H_2$ and 95% He.

After cooling, measurement of the nuclear-fuel sintered pellets through the use of X-ray diffractometry showed that these nuclear-fuel sintered pellets, insofar as they were situated between the nuclear-fuel sintered pellets at each end of the column, had a surface layer of virtually 100% $UB_4$ and $UB_2$ by volume under their external surface. The thickness of this surface layer was determined as 12 μm on average by using a microscope for a transverse and a longitudinal ground section of the nuclear-fuel sintered pellets. The variation between maximum value and minimum value of this thickness was 6 μm. The rest of the sintered pellets were formed virtually only of unaltered $UO_2$ without a detectable boron content.

When boron powder was used instead of $ZrB_2$ powder for the powder bed, surface layers of virtually 100% $UB_2$ and $UB_4$ by volume with a thickness of 21 μm±5 μm were produced under the external surface of the nuclear-fuel sintered pellets. In this case again, the rest of the sintered pellets were formed virtually of unaltered $UO_2$ without a detectable boron content.

In a further exemplary embodiment, use was made of an $Al_2O_3$ tube which was disposed with a horizontal longitudinal axis in an electrically heated tube furnace. Two thirds of the empty volume of this $Al_2O$ tube was filled with $ZrB_2$ powder in which twelve ceramic nuclear-fuel sintered pellets made of $UO_2$, likewise with sinter densities of between 10.38 and 10.44 g/cm$^3$, were embedded. The nuclear-fuel sintered pellets likewise had the form of a solid cylinder with a diameter of 9.11 mm and a height of 10 mm. The $Al_2O_3$ tube was rotated about its longitudinal axis at one revolution per minute, so that the powder, together with the nuclear-fuel sintered pellets, was circulated. In this case, the powder and the nuclear-fuel sintered pellets were heated for three hours at a treatment temperature of 1400° C. under a surrounding atmosphere in the tube furnace being formed of 5% $H_2$ and 95% He.

After cooling, the nuclear-fuel sintered pellets had a surface layer of virtually 100% $UB_2$ and $UB_4$ by volume under their entire surface. This surface layer had, below the external surface of the nuclear-fuel sintered pellets, a thickness of 16 μm±4 μm and, at the two end surfaces, a thickness of 7 μm±3 μm. The rest of the sintered pellets was unaltered $UO_2$ without a detectable boron content.

In a variant of this exemplary embodiment, fifteen ceramic nuclear-fuel sintered pellets made of $UO_2$, which likewise had the form of a solid cylinder with a diameter of 9.11 mm and a height of 10 mm, were mounted without a powder bed in the $Al_2O_3$ tube, and this tube was likewise rotated in the tube furnace about its horizontal longitudinal axis at one revolution per minute. A gas mixture of diborane $B2H_6$ and $H_2$ was fed through a duct into the internal space of the tube, which was closed at both ends in gas-tight fashion, and fed out again through another duct. The flow rate of the gas mixture was 10 liters per minute, and the composition was 99.9 mole % $H_2$ and 0.1 mole % $B2H_6$. The nuclear-fuel sintered pellets made of $UO_2$ in this case were kept at a temperature of 1050° C. in the tube furnace for 90 minutes.

After cooling, these nuclear-fuel sintered pellets made of $UO_2$ had a surface layer with a thickness of 8 μm that was formed of 100% by weight $UB_2$ and $UB_4$ under their entire surface. The rest of the sintered pellets was unaltered $UO_2$ without a detectable boron content.

The surface layer containing $UB_2$ and $UB_4$ can also be formed in the nuclear-fuel sintered pellet made of $UO_2$ by embedding this nuclear-fuel sintered pellet in boron and/or a boron-containing chemical compound, which are in the molten state.

It is expedient if the isotope $B_{10}$ in the boron is enriched relative to the natural isotopic composition of boron, in the boron being used or in the boron-containing chemical compounds being used. This can be achieved in a known manner, for example by cyclotron enrichment, diffusion enrichment or separation nozzle enrichment. It is this isotope $B_{10}$ that essentially absorbs the thermal neutrons. By virtue of the fact that it is enriched in the boron that is situated in the surface layer of the uranium-containing nuclear-fuel sintered pellet, the thickness of this surface layer can be selected to be comparatively small.

In a similar way, it is even possible to treat uranium-containing ceramic nuclear-fuel sintered pellets that contain at least one of the chemical compounds $(U, Pu)O_2$, $(U, Th)O_2$, $(U, RE)O_2$, $(U, Pu, Th)O_2$, $(U, Pu, RE)O_2$, $(U, Th, RE)O_2$ and $(U, Pu, Th, RE)O_2$, since the other heavy metals in these mixed oxides all form borides structured identically or similarly to that which uranium forms. The rare earths RE may, in particular, be gadolinium, samarium, europium, erbium and dysprosium, which are all neutron poisons, but can exhibit a burnout behavior due to the physical effects of neutrons which is different from that of boron, and therefore can advantageously influence the reactivity control in a nuclear reactor, in combination with boron.

It is advantageous to fit the uranium-containing nuclear-fuel sintered pellets according to the invention in a cladding tube of a fuel rod, wherein the cladding tube is generally made of a zirconium alloy or stainless steel, and to seal this cladding tube. This fuel rod is expediently a component of a nuclear-reactor fuel assembly for a nuclear reactor. Advantageously, such a nuclear-reactor fuel assembly is intended for a light water nuclear reactor, in particular for a pressurized water nuclear reactor or a boiling water nuclear reactor.

Tests simulating the conditions in a nuclear reactor and being carried out with such a cladding tube showed not only that the boron-containing surface layer of the uranium-containing nuclear-fuel sintered pellets is firmly anchored in the crystal structure of these nuclear-fuel sintered pellets, but also that the boron does not escape from this surface layer, even at temperatures of 500° C. and above.

We claim:

1. A uranium-containing nuclear-fuel sintered pellet containing $UO_2$, comprising a sintered-pellet surface layer being formed of at least 80% by volume of a chemical boron compound $UB_x$ with at least one number x from a number set 2; 4 and 12, and a remainder of the sintered pellet containing at most 5% by volume of the chemical boron compound.

2. A uranium-containing nuclear-fuel sintered pellet containing $(U, Pu)O_2$, comprising a sintered-pellet surface layer being formed of at least 80% by volume of a chemical boron compound $(U, Pu)B_x$ with at least one number x from a number set 2; 4 and 12, and a remainder of the sintered pellet containing at most 5% by volume of the chemical boron compound.

3. A uranium-containing nuclear-fuel sintered pellet containing $(U, Th)O_2$, comprising a sintered-pellet surface layer being formed of at least 80% by volume of a chemical boron compound $(U, Th)B_x$ with at least one number x from a number set 4 and 6, and a remainder of the sintered pellet containing at most 5% by volume of the chemical boron compound.

4. A uranium-containing nuclear-fuel sintered pellet containing $(U, RE)O_2$ (RE=rare earth), comprising a sintered-pellet surface layer being formed of at least 80% by volume of a chemical boron compound $(U, RE)B_x$ with at least one number x from a number set 4; 6 and 12, and a remainder of the sintered pellet containing at most 5% by volume of the chemical boron compound.

5. A uranium-containing nuclear-fuel sintered pellet containing $(U, Pu, Th)O_2$, comprising a sintered-pellet surface layer being formed of at least 80% by volume of a chemical boron compound $(U, Pu, Th)B_x$ with at least one number x from a number set 2; 4; 6 and 12, and a remainder of the sintered pellet containing at most 5% by volume of the chemical boron compound.

6. A uranium-containing nuclear-fuel sintered pellet containing $(U, Pu, RE)O_2$ (RE=rare earth), comprising a sintered-pellet surface layer being formed of at least 80% by volume of a chemical boron compound $(U, Pu, RE)B_x$ with at least one number x from a number set 2; 4; 6 and 12, and a remainder of the sintered pellet containing at most 5% by volume of the chemical boron compounds.

7. A uranium-containing nuclear-fuel sintered pellet containing $(U, Th, RE)O_2$ (RE=rare earth), comprising a sintered-pellet surface layer being formed of at least 80% by volume of a chemical boron compound $(U, Th, RE)B_x$ with at least one number x from a number set 4 and 6, and a remainder of the sintered pellet containing at most 5% by volume of the chemical boron compound.

8. A uranium-containing nuclear-fuel sintered pellet containing $(U, Pu, Th, RE)O_2$ (RE=rare earth), comprising a sintered-pellet surface layer being formed of at least 80% by volume of a chemical boron compound $(U, Pu, Th, RE)B_x$ with at least one number x from a number set 4 and 6, and a remainder of the sintered pellet containing at most 5% by volume of the chemical boron compound.

9. The uranium-containing nuclear-fuel sintered pellet according to claim 1, including at least 90% by volume of the chemical boron compounds in the sintered-pellet surface, and at most 2% by volume of the chemical boron compounds in the remainder of the sintered pellet.

10. The uranium-containing nuclear-fuel sintered pellet according to claim 2, including at least 90% by volume of the chemical boron compounds in the sintered-pellet surface, and at most 2% by volume of the chemical boron compounds in the remainder of the sintered pellet.

11. The uranium-containing nuclear-fuel sintered pellet according to claim 3, including at least 90% by volume of the chemical boron compounds in the sintered-pellet surface, and at most 2% by volume of the chemical boron compounds in the remainder of the sintered pellet.

12. The uranium-containing nuclear-fuel sintered pellet according to claim 4, including at least 90% by volume of the chemical boron compounds in the sintered-pellet surface, and at most 2% by volume of the chemical boron compounds in the remainder of the sintered pellet.

13. The uranium-containing nuclear-fuel sintered pellet according to claim 5, including at least 90% by volume of the chemical boron compounds in the sintered-pellet surface, and at most 2% by volume of the chemical boron compounds in the remainder of the sintered pellet.

14. The uranium-containing nuclear-fuel sintered pellet according to claim 6, including at least 90% by volume of the chemical boron compounds in the sintered-pellet surface, and at most 2% by volume of the chemical boron compounds in the remainder of the sintered pellet.

15. The uranium-containing nuclear-fuel sintered pellet according to claim 7, including at least 90% by volume of the chemical boron compounds in the sintered-pellet surface, and at most 2% by volume of the chemical boron compounds in the remainder of the sintered pellet.

16. The uranium-containing nuclear-fuel sintered pellet according to claim 8, including at least 90% by volume of the chemical boron compounds in the sintered-pellet surface, and at most 2% by volume of the chemical boron compounds in the remainder of the sintered pellet.

17. The uranium-containing nuclear-fuel sintered pellet according to claim 1, including at least 98% by volume of the chemical boron compound in the sintered-pellet surface layer, and at most 1% by volume of the chemical boron compound in the remainder of the sintered pellet.

18. The uranium-containing nuclear-fuel sintered pellet according to claim 2, including at least 98% by volume of the chemical boron compound in the sintered-pellet surface layer, and at most 1% by volume of the chemical boron compound in the remainder of the sintered pellet.

19. The uranium-containing nuclear-fuel sintered pellet according to claim 3, including at least 98% by volume of the chemical boron compound in the sintered-pellet surface layer, and at most 1% by volume of the chemical boron compound in the remainder of the sintered pellet.

20. The uranium-containing nuclear-fuel sintered pellet according to claim 4, including at least 98% by volume of the chemical boron compound in the sintered-pellet surface layer, and at most 1% by volume of the chemical boron compound in the remainder of the sintered pellet.

21. The uranium-containing nuclear-fuel sintered pellet according to claim 5, including at least 98% by volume of the chemical boron compound in the sintered-pellet surface layer, and at most 1% by volume of the chemical boron compound in the remainder of the sintered pellet.

22. The uranium-containing nuclear-fuel sintered pellet according to claim 6, including at least 98% by volume of the chemical boron compound in the sintered-pellet surface layer, and at most 1% by volume of the chemical boron compound in the remainder of the sintered pellet.

23. The uranium-containing nuclear-fuel sintered pellet according to claim 7, including at least 98% by volume of the chemical boron compound in the sintered-pellet surface layer, and at most 1% by volume of the chemical boron compound in the remainder of the sintered pellet.

24. The uranium-containing nuclear-fuel sintered pellet according to claim 8, including at least 98% by volume of the chemical boron compound in the sintered-pellet surface layer, and at most 1% by volume of the chemical boron compound in the remainder of the sintered pellet.

25. The uranium-containing nuclear-fuel sintered pellet according to claim 1, wherein the remainder of the sintered pellet is without a detectable boron content.

26. The uranium-containing nuclear-fuel sintered pellet according to claim 2, wherein the remainder of the sintered pellet is without a detectable boron content.

27. The uranium-containing nuclear-fuel sintered pellet according to claim 3, where in the remainder of the sintered pellet is without a detectable boron content.

28. The uranium-containing nuclear-fuel sintered pellet according to claim 4, wherein the remainder pellet sintered pellet is without a detectable boron content.

29. The uranium-containing nuclear-fuel sintered pellet according to claim 5, wherein the remainder of the sintered pellet is without a detectable boron content.

30. The uranium-containing nuclear-fuel sintered pellet according to claim 6, wherein the remainder of the sintered pellet is without a detectable boron content.

31. The uranium-containing nuclear-fuel sintered pellet according to claim 7, wherein the remainder of the sintered pellet is without a detectable boron content.

32. The uranium-containing nuclear-fuel sintered pellet according to claim 8, wherein the remainder of the sintered pellet is without a detectable boron content.

33. The nuclear-fuel sintered pellet according to claim 1, wherein the boron-containing sintered-pellet surface layer has a thickness of from 2 to 40 µm.

34. The nuclear-fuel sintered pellet according to claim 2, wherein the boron-containing sintered-pellet surface layer has a thickness of from 2 to 40 µm.

35. The nuclear-fuel sintered pellet according to claim 3, wherein the boron-containing sintered-pellet surface layer has a thickness of from 2 to 40 µm.

36. The nuclear-fuel sintered pellet according to claim 4, wherein the boron-containing sintered-pellet surface layer has a thickness of from 2 to 40 µm.

37. The nuclear-fuel sintered pellet according to claim 5, wherein the boron-containing sintered-pellet surface layer has a thickness of from 2 to 40 µm.

38. The nuclear-fuel sintered pellet according to claim 6, wherein the boron-containing sintered-pellet surface layer has a thickness of from 2 to 40 µm.

39. The nuclear-fuel sintered pellet according to claim 7, wherein the boron-containing sintered-pellet surface layer has a thickness of from 2 to 40 µm.

40. The nuclear-fuel sintered pellet according to claim 8, wherein the boron-containing sintered-pellet surface layer has a thickness of from 2 to 40 µm.

41. The nuclear-fuel sintered pellet according to claim 1, wherein the boron-containing sintered-pellet surface layer has a thickness of from 5 to 20 µm.

42. The nuclear-fuel sintered pellet according to claim 2, wherein the boron-containing sintered-pellet surface layer has a thickness of from 5 to 20 µm.

43. The nuclear-fuel sintered pellet according to claim 3, wherein the boron-containing sintered-pellet surface layer has a thickness of from 5 to 20 µm.

44. The nuclear-fuel sintered pellet according to claim 4, wherein the boron-containing sintered-pellet surface layer has a thickness of from 5 to 20 µm.

45. The nuclear-fuel sintered pellet according to claim 5, wherein the boron-containing sintered-pellet surface layer has a thickness of from 5 to 20 µm.

46. The nuclear-fuel sintered pellet according to claim 6, wherein the boron-containing sintered-pellet surface layer has a thickness of from 5 to 20 µm.

47. The nuclear-fuel sintered pellet according to claim 7, wherein the boron-containing sintered-pellet surface layer has a thickness of from 5 to 20 µm.

48. The nuclear-fuel sintered pellet according to claim 8, wherein the boron-containing sintered-pellet surface layer has a thickness of from 5 to 20 µm.

49. The nuclear-fuel sintered pellet according to claim 1, wherein an isotope $B_{10}$ in boron of the chemical boron compound is enriched relative to a natural isotopic composition.

50. The nuclear-fuel sintered pellet according to claim 2, wherein an isotope $B_{10}$ in boron of the chemical boron compound is enriched relative to a natural isotopic composition.

51. The nuclear-fuel sintered pellet according to claim 3, wherein an isotope $B_{10}$ in boron of the chemical boron compound is enriched relative to a natural isotopic composition.

52. The nuclear-fuel sintered pellet according to claim 4, wherein an isotope $B_{10}$ in boron of the chemical boron compound is enriched relative to a natural isotopic composition.

53. The nuclear-fuel sintered pellet according to claim 5, wherein an isotope $B_{10}$ in boron of the chemical boron compound is enriched relative to a natural isotopic composition.

54. The nuclear-fuel sintered pellet according to claim 6, wherein an isotope $B_{10}$ in boron of the chemical boron compound is enriched relative to a natural isotopic composition.

55. The nuclear-fuel sintered pellet according to claim 7, wherein an isotope $B_{10}$ in boron of the chemical boron compound is enriched relative to a natural isotopic composition.

56. The nuclear-fuel sintered pellet according to claim 8, wherein an isotope $B_{10}$ in boron of the chemical boron compound is enriched relative to a natural isotopic composition.

57. A nuclear-reactor fuel assembly, comprising a fuel rod having a cladding tube; and a uranium-containing nuclear-fuel sintered pellet in said cladding tube, said uranium-containing nuclear-fuel sintered pellet containing $UO_2$ and having a sintered-pellet surface layer being formed of at least 80% by volume of a chemical boron compound $UB_x$ with at least one number x from a number set 2; 4 and 12, and a remainder of the sintered pellet containing at most 5% by volume of the chemical boron compound.

58. A nuclear-reactor fuel assembly, comprising a fuel rod having a cladding tube; and a uranium-containing nuclear-fuel sintered pellet in said cladding tube, said uranium-containing nuclear-fuel sintered pellet containing $(U, Pu)O_2$ and having a sintered-pellet surface layer being formed of at least 80% by volume of a chemical boron compound $(U, Pu)B_x$ with at least one number x from a number set 2; 4 and 12, and a remainder of the sintered pellet containing at most 5% by volume of the chemical boron compound.

59. A nuclear-reactor fuel assembly, comprising a fuel rod having a cladding tube; and a uranium-containing nuclear-fuel sintered pellet in said cladding tube, said uranium-containing nuclear-fuel sintered pellet containing $(U, Th)O_2$ and having a sintered-pellet surface layer being formed of at least 80% by volume of a chemical boron compound $(U, Th)B_x$ with at least one number x from a number set 4 and 6, and a remainder of the sintered pellet containing at most 5% by volume of the chemical boron compound.

60. A nuclear-reactor fuel assembly, comprising a fuel rod having a cladding tube; and a uranium-containing nuclear-fuel sintered pellet in said cladding tube, said uranium-containing nuclear-fuel sintered pellet containing $(U, RE)O_2$ (RE=rare earth) and having a sintered-pellet surface layer being formed of at least 80% by volume of a chemical boron compound $(U, RE)B_x$ with at least one number x from a number set 4; 6 and 12, and a remainder of the sintered pellet containing at most 5% by volume of the chemical boron compound.

61. A nuclear-reactor fuel assembly, comprising a fuel rod having a cladding tube; and a uranium-containing nuclear-fuel sintered pellet in said cladding tube, said uranium-containing nuclear-fuel sintered pellet containing (U, Pu, Th)$O_2$ and having a sintered-pellet surface layer being formed of at least 80% by volume of a chemical boron compound (U, Pu, Th)B$_x$ with at least one number x from a number set 2; 4; 6 and 12, and a remainder of the sintered pellet containing at most 5% by volume of the chemical boron compound.

62. A nuclear-reactor fuel assembly, comprising a fuel rod having a cladding tube; and a uranium-containing nuclear-fuel sintered pellet in said cladding tube, said uranium-containing nuclear-fuel sintered pellet containing (U, Pu, RE)$O_2$ (RE =rare earth) and having a sintered-pellet surface layer being formed of at least 80% by volume of a chemical boron compound (U, Pu, RE)B$_x$ with at least one number x from a number set 2; 4; 6 and 12, and a remainder of the sintered pellet containing at most 5% by volume of the chemical boron compounds.

63. A nuclear-reactor fuel assembly, comprising a fuel rod having a cladding tube; and a uranium-containing nuclear-fuel sintered pellet in said cladding tube, said uranium-containing nuclear-fuel sintered pellet containing (U, Th, RE)$O_2$ (RE=rare earth) and having a sintered-pellet surface layer being formed of at least 80% by volume of a chemical boron compound (U, Th, RE)B$_x$ with at least one number x from a number set 4 and 6, and a remainder of the sintered pellet containing at most 5% by volume of the chemical boron compound.

64. A nuclear-reactor fuel assembly, comprising a fuel rod having a cladding tube; and a uranium-containing nuclear-fuel sintered pellet in said cladding tube, said uranium-containing nuclear-fuel sintered pellet containing (U, Pu, Th, RE)$O_2$ (RE=rare earth) and having a sintered-pellet surface layer being formed of at least 80% by volume of a chemical boron compound (U, Pu, Th, RE)B$_x$ with at least one number x from a number set 4 and 6, and a remainder of the sintered pellet containing at most 5% by volume of the chemical boron compound.

65. A nuclear fuel sintered pellet, comprising an oxide of a uranium containing metal and at least one boride of the uranium containing metal, a surface layer being formed of at least 80% by volume of said at least one boride of the uranium containing metal, and a remainder being formed of at most 5% by volume of said at least one boride of the uranium containing metal.

66. A nuclear fuel sintered pellet, comprising: an oxide of a uranium containing metal and at least one boride of the uranium containing metal, said at least one boride of the uranium containing metal forming at least 80% by volume of a surface layer of the sintered pellet and at most 5% by volume of a remainder of the sintered pellet.

67. The nuclear fuel sintered pellet according to claim 66, wherein said oxide of the Uranium containing metal is UO$_2$, and said at least one boride is UB$_x$ wherein x is at least one number from a number set 2, 4 and 12.

68. The nuclear fuel sintered pellet according to claim 66, wherein said oxide of the uranium containing metal is (U, Pu)O$_2$, and said at least one boride is (U, Pu)B$_x$ wherein x is at least one number from a number set 2, 4 and 12.

69. The nuclear fuel sintered pellet according to claim 66, wherein said oxide of the uranium containing metal is (U, Th)O$_2$, and said at least one boride is (U, Th)B$_x$ wherein x is at least one number from a number set 4 and 6.

70. The nuclear fuel sintered pellet according to claim 66, wherein said oxide of the Uranium containing metal is (U, RE)O$_2$ (RE=rare earth), and said at least one boride is (U, RE)B$_x$ wherein x is at least one number from a number set 4, 6 and 12.

71. The nuclear fuel sintered pellet according to claim 66, wherein said oxide of the uranium containing metal is (U, Pu, Th)O$_2$, and said at least one boride is (U, Pu, Th)B$_x$ wherein x is at least one;number from a number set 2, 4, 6 and 12.

72. The nuclear fuel sintered pellet according to claim 66, wherein said oxide of the uranium containing metal is (U, Pu, RE)O$_2$ (RE=rare earth), and said at least one boride is (U, Pu, RE)B$_x$ wherein x is at least one number from a number set 2, 4, 6 and 12.

73. The nuclear fuel sintered pellet according to claim 66, wherein said oxide of the Uranium containing metal is (U, Th, RE)O$_2$ (RE=rare earth), and said at least one boride is (U, Th, RE)B$_x$ wherein x is at least one number from a number set 4 and 6.

74. The nuclear fuel sintered pellet according to claim 66, wherein said oxide of the Uranium containing metal is (U, Pu, Th, RE)O$_2$ (RE=rare earth) and said at least one boride is (U, Pu, Th, RE)B$_x$ wherein x is at least one number from a number set 4 and 6.

75. The nuclear fuel sintered pellet according to claim 66, wherein said at least one boride of the uranium containing metal forms at least 90% by volume of said surface layer and at most 2% by volume of said remainder.

76. The nuclear fuel sintered pellet according to claim 66, wherein said at least one boride of the uranium containing metal forms at least 98% by volume of said surface layer and at most 1% by volume of said remainder.

77. The nuclear fuel sintered pellet according to claim 66, wherein said remainder is without a detectable boron content.

78. The nuclear fuel sintered pellet according to claim 66, wherein said surface layer has a thickness of from 2 to 40 µm.

79. The nuclear fuel sintered pellet according to claim 90, wherein said surface layer has a thickness of from 5 to 20 µm.

80. The nuclear fuel sintered pellet according to claim 66, wherein an isotope B$_{10}$ in boron of said at least one boride is enriched relative to a natural isotopic composition.

81. A nuclear reactor fuel assembly, comprising:

a fuel rod having a cladding tube;

a nuclear fuel sintered pellet contained in said cladding tube; and said sintered pellet containing an oxide of a uranium containing metal and at least one boride of the uranium containing metal, said at least one boride of the uranium containing metal forming at least 80% by volume of a surface layer of said sintered pellet and at most 5% by volume of a remainder of said sintered pellet.

* * * * *